Aug. 2, 1966

S. HILLER 3,263,577

SUBTERRANEAN UTILITY DISTRIBUTION SYSTEM

Filed Aug. 8, 1962

INVENTOR.
STANLEY HILLER

BY *Bieber & Schlemmer*

ATTORNEYS

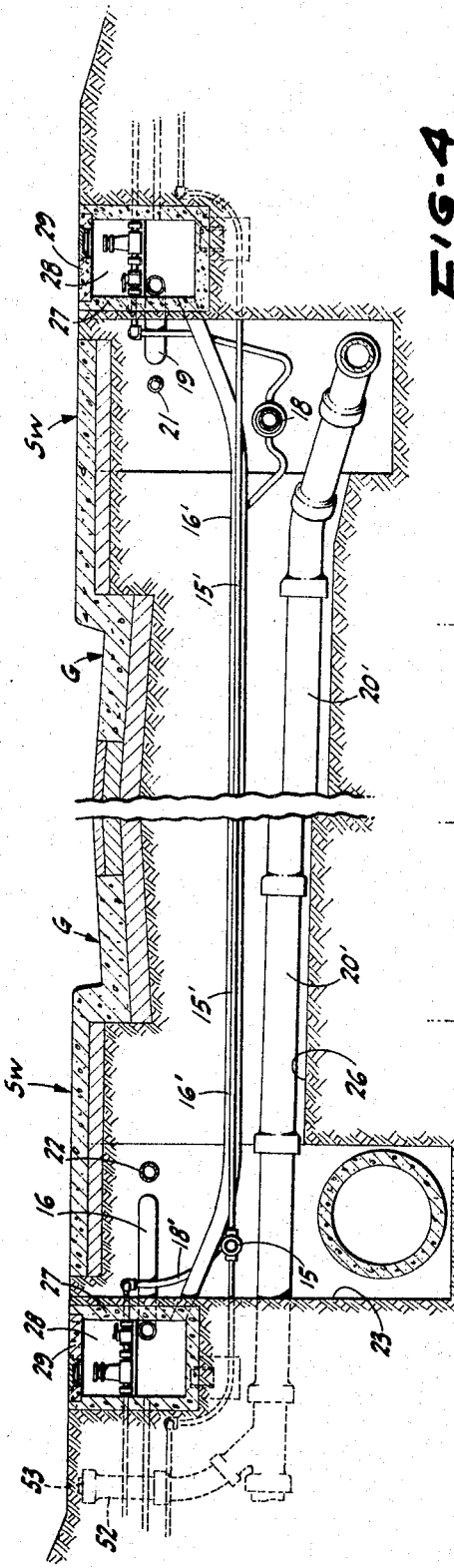
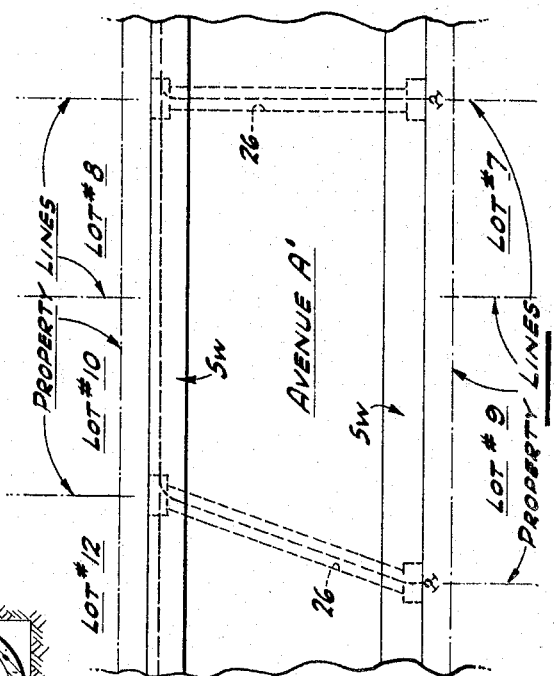
FIG-4
FIG-13
INVENTOR.
STANLEY HILLER
BY
ATTORNEYS

INVENTOR.
STANLEY HILLER

BY

ATTORNEYS

United States Patent Office 3,263,577
Patented August 2, 1966

3,263,577
SUBTERRANEAN UTILITY DISTRIBUTION
SYSTEM
Stanley Hiller, Berkeley, Calif.
(1 Hiller Drive, Oakland, Calif.)
Filed Aug. 8, 1962, Ser. No. 215,711
9 Claims. (Cl. 94—1)

This invention relates to a utilities system for a parcel of land and, more particularly, to a system for subdividing a parcel of land into a plurality of lots and access roadways thereto, and for providing such lots with utility services.

In subdividing a parcel of land for building construction, such as for industrial plants, and residential houses in particular, the present practice is to lay out roadways and divide the land therealong into lots each of which is intended to accommodate a dwelling. Quite apparently, a number of utility services must be provided for each lot, and such services usually include a sanitary sewer, water, electricity, gas, telephone, and often both a storm drainage system and a fire alarm system. Some, and frequently all, of such services are underground systems, and since in present practice each service is usually installed by a different contractor or supplier of the particular service, each such contractor or supplier digs and back-fills his own trench in which the particular utility conduit is buried. As a result, the lands in general and the roadways in particular are a maze of back-filled trenches filled at different times under varying conditions, instead of a homogeneously compacted road-bed.

The consequent maze of trenches is undesirable in that the natural compaction of the land is disturbed thereby and this is a primary cause of subsequent road-surface cracking and buckling which necessitates costly repairs thereon. In addition, the provision of utility services in this manner is time consuming and exceedingly costly in that it is seldom that more than one utility service can be or is installed at any particular time which makes completion of the utilities system of interminable duration.

Moreover, it has been discovered that breakages along utility conduits generally occur in the main sections thereof rather than in the branch conduits, and it is believed that such occurrence is related to the disposition of the main conduit sections beneath and along the length of the roadways, thus enabling impact forces to be transmitted thereto. These forces develop incrementally advancing shearing forces therealong each time such roadways are traversed by automobiles and services vehicles. At any rate, a break in the main section of the conduit supplying each of the utility services, requires a separate excavation of the roadway in order to repair the break.

In view of the foregoing, an object of the present invention is to provide an improved system for developing a parcel of land for building construction. Another object of the invention is in the provision of an improved system of installing in a parcel of land subdivided into a plurality of lots having an access roadway, all necessary or desired utility services in a manner such that the access roadway is substantially devoid of longitudinally extending main utility conduits—being crossed only at predetermined locations therealong by branch utility conduits. Still another object is that of providing a system of the type described in which the branch utility conduits are oriented and located to extend between the vicinity of a common property line separating two adjacent lots on one side of the roadway and the vicinity of a common property line separating two adjacent lots on the opposite side of the roadway.

A further object is to provide for installing in a parcel of land having a longitudinally extending length of roadway located therein and a plurality of lots along each side of the roadway, one or more groups of main utility conduits respectively extending along a side of the roadway laterally exterior thereof, with all of the main utility conduits in a group thereof being disposed within the same passageway or back-filled trench; and also a plurality of groups of branch conduits, each group of which extends across the roadway in a single passageway or back-filled trench, with the various groups thereof being longitudinally spaced along the roadway and respectively extending from the vicinity of a common property line between a pair of adjacent lots on one side of the roadway to the vicinity of the common property line between a pair of adjacent lots on the opposite side of the roadway.

Yet a further object is in the provision of a system of the character described in which each of the branch passageways or back-filled trenches is provided adjacent each end thereof with a distribution box defining a compartment therewithin which affords a location for connection of certain utility services to the lots adjacent thereto. Additional objects and advantages will become apparent as the specification develops.

Embodiments of the invention are illustrated in the accompanying drawings in which:

FIGURE 4 is a transverse sectional view taken along the plane 4—4 of FIGURE 3;

FIGURE 5 is a broken transverse sectional view taken along the plane 5—5 of FIGURE 3;

FIGURE 6 is a broken longitudinal sectional view taken along the plane 6—6 of FIGURE 3;

FIGURE 13 is a broken top plan view similar to FIGURE 1 of a parcel of land illustrating a modified lot arrangement and the provision of utility services therefor.

Figure 1:
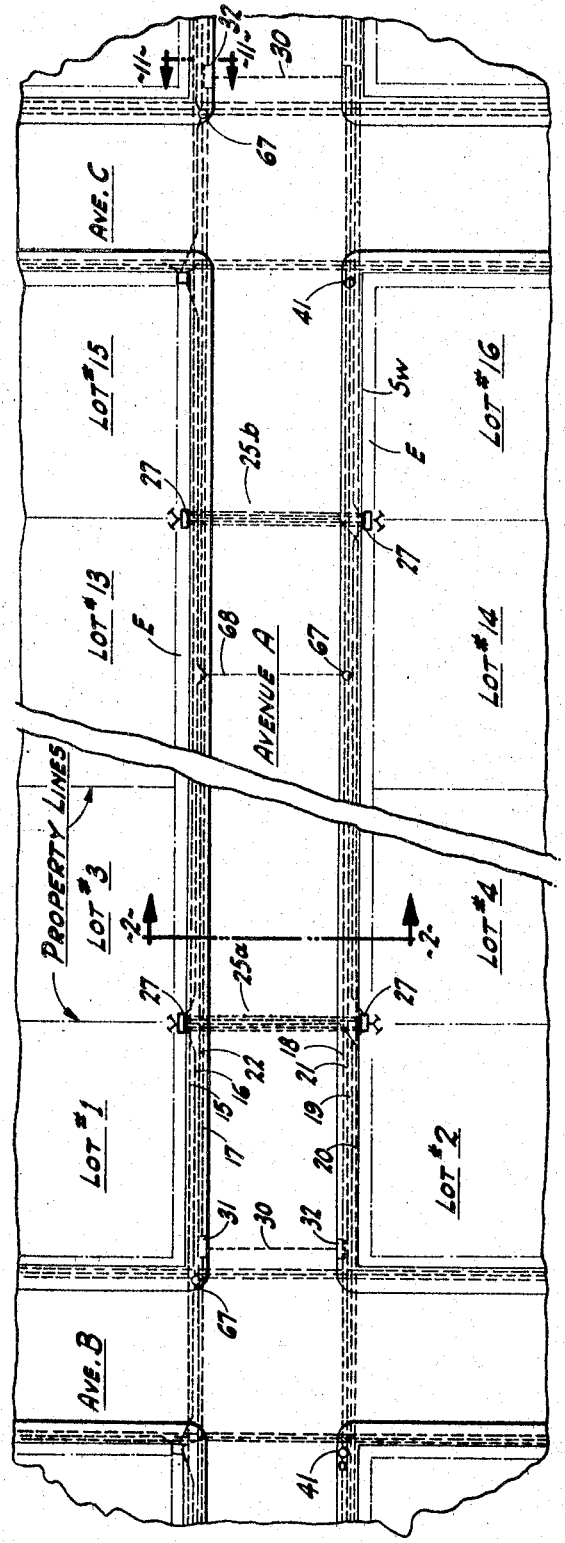
FIGURE 1 is a broken top plan view of a portion of a parcel of land subdivided and provided with utility services in accordance with the present invention.

The portion of a subdivided parcel of land as illustrated in FIGURE 1 is intended to exemplify a typical arrangement in which such parcel is provided with a plurality of intersecting roadways each of which has a plurality of lots on each side thereof. Most advantageously, there are an even number of lots on each side of the various roadways, although this is in no sense essential. It will be appreciated that the size of each lot, the number of lots in a block, and the length of any block will vary considerably depending upon the location of the parcel of land, the topography thereof and the desires of the subdivider. The portion of the parcel shown in FIGURE 1 has three lengths of roadways respectively identified as Avenues A, B and C, the latter two of which intersect Avenue A and are oriented in substantially parallel relation.

Disposed along Avenue A on one side thereof are a plurality of lots that for identification are denoted as lots 1, 3, 13 and 15, and on the opposite side of Avenue A the various lots are denoted as 2, 4, 14 and 16. Quite evidently, the adjacent lots on each side of Avenue A are separated by common property lines, and the frontage of each lot along Avenue A is spaced therefrom, as shown most clearly in FIGURES 1 and 3.

Figure 2:
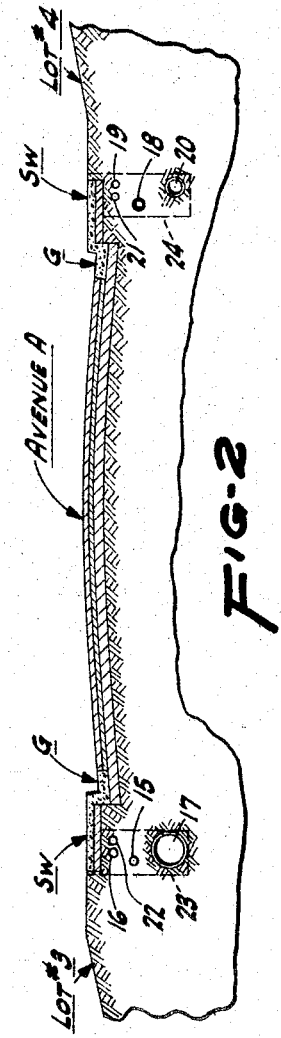
FIGURE 2 is an enlarged broken transverse sectional view taken along the plane 2—2 of FIGURE 1.
Figure 3:
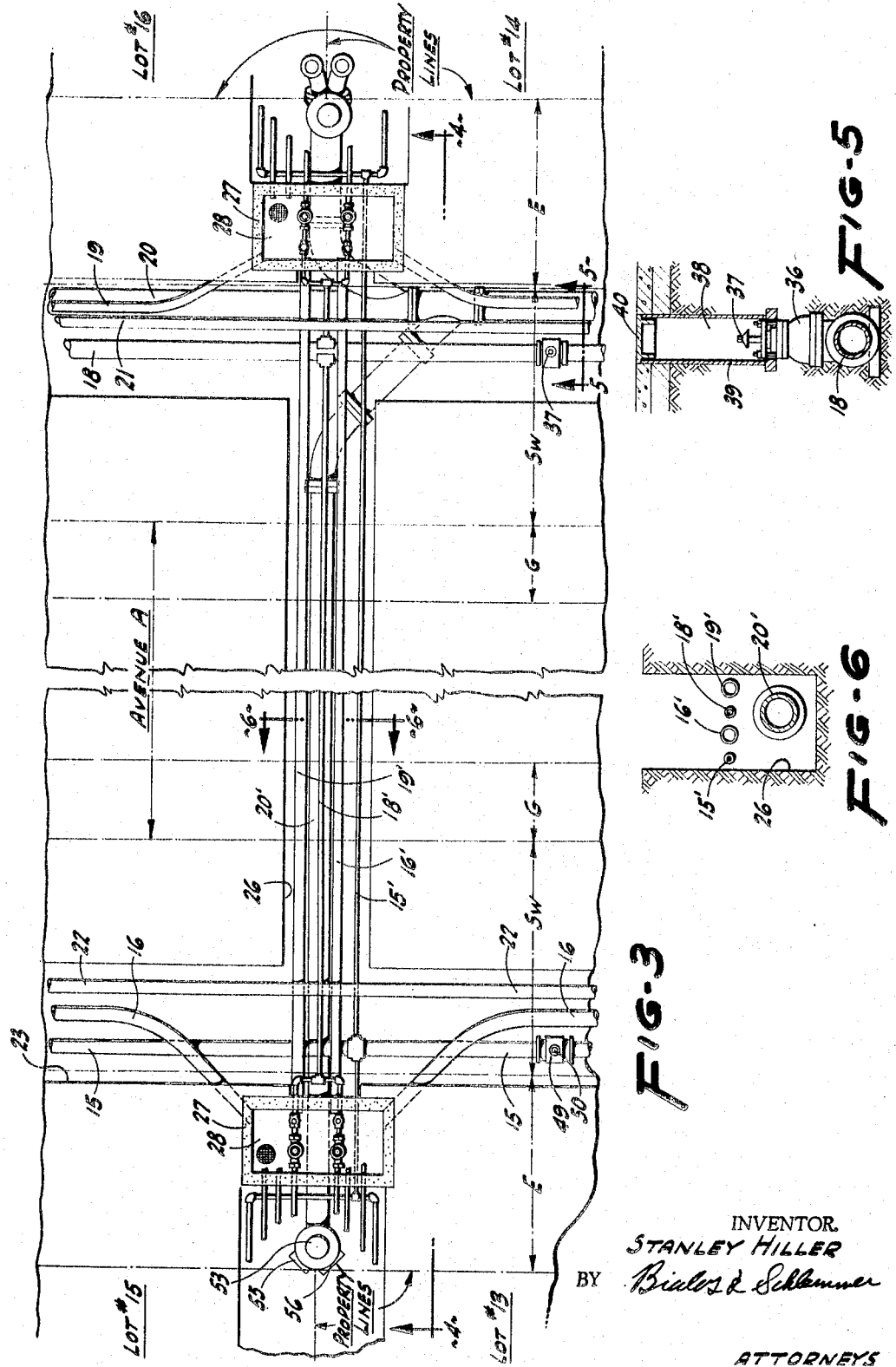
FIGURE 3 is an enlarged broken top plan view of a segment of the lot grouping shown in FIGURE 1 illustrating the interconnection of the main and branch utility conduits and the provision of utility services at adjacent lots on opposite sides of the roadway.
Figure 7:
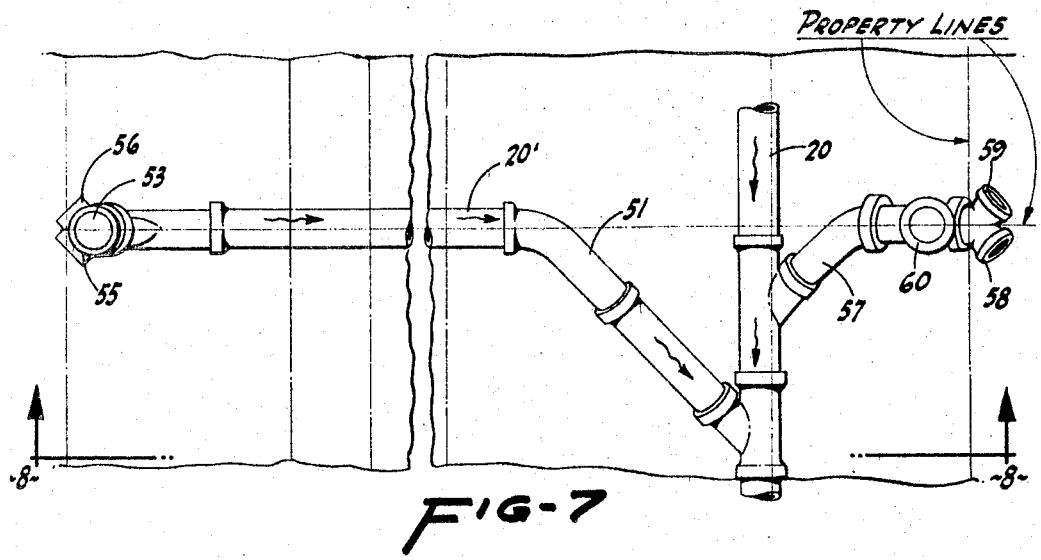
FIGURE 7 is a broken top plan view illustrating the disposition of the main sewage conduit and certain branch conduits connected thereto.
Figure 8:
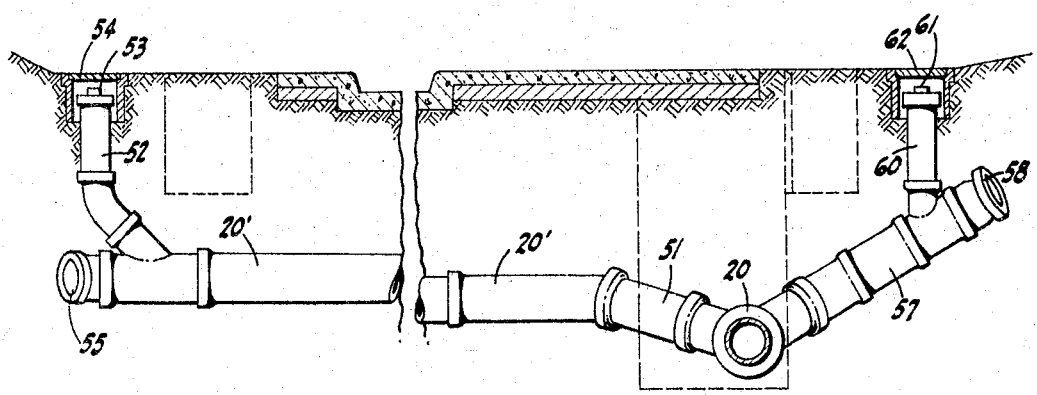
FIGURE 8 is a transverse sectional view taken along plane 8—8 of FIGURE 7.
Figure 9:
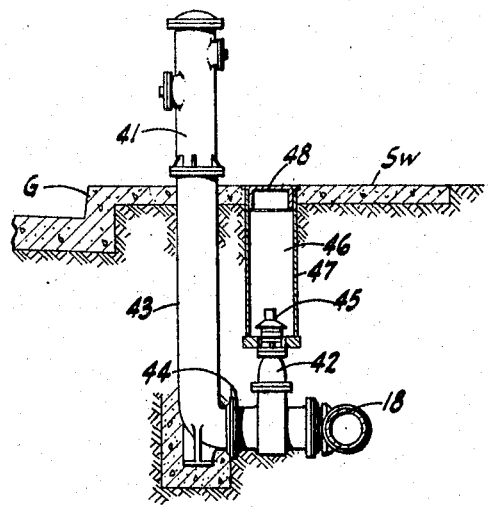
FIGURE 9 is a broken vertical sectional view illustrating the connection of a water hydrant to the main water conduit.

Extending along each side of Avenue A is a sidewalk, each of which is designated in FIGURE 3 with the letters SW, and interposed between the respective sidewalks and the frontage property line of the adjacent lots is a strip of land, which may be an easement, designated by the letter E. The provision of sidewalks, easements, and the precise character of the sidewalks, if any, and roadways may vary considerably from location to location. As shown in FIGURE 2, Avenue A has a typically paved surface of asphalt supported upon an underbed of rock or gravel or other suitable material. The marginal edge portions of Avenue A defining the mergence thereof with the bordering sidewalks are defined by gutters G, which in the structure illustrated is formed of concrete as are the sidewalks.

The various lots on the opposite sides of the roadways may be laid out in precise symmetry, as shown in FIGURE 1, in which case the common property lines dividing two adjacent lots on one side of Avenue A are aligned with the respectively corresponding common property lines dividing adjacent lots on the opposite side of Avenue A. However, an orientation of this character is not essential and the division of the property into individual lots may provide various arrangements as, for example, the layout illustrated in FIGURE 13, in which certain property lines on opposite side of Avenue A' are in alignment, while others are offset. More specifically, and with reference to FIGURE 13, the property line dividing lots 6 and 8 is transversely aligned with the property line dividing lots 5 and 7 on the opposite side of the roadway, while the property line dividing lots 10 and 12 is offset longitudinally from the common property line dividing lots 9 and 11.

As shown most clearly in FIGURES 1 and 13, the utility services and conduits thereof are arranged for connection to the various lots at common property lines therebetween. More specifically, in FIGURE 1 the various utility services are provided for lots 1 and 3 in the vicinity of the common property line separating the same and are also provided for lots 3 and 4 in the vicinity of the common property line therebetween. In a corresponding manner, lots 13 and 15 are serviced at the property line therebetween as are lots 14 and 16. Quite apparently then, locations for utility service connections to buildings erected on the various lots are provided at alternate property lines along Avenue A on each side thereof, and the conduits which provide such services are oriented and located so as to extend from the vicinity of a property line on one side of the roadway to the vicinity of the next closest property line in the alternate sequence thereof on the opposite side of the roadway.

Thus, the transversely oriented utility conduits in the arrangement illustrated in FIGURE 1 extend between the common property lines dividing lots 1, 3 and 2, 4; 13, 15 and 14, 16; etc. In this layout the transversely oriented conduits are in general transverse alignment with the property lines between which they extend since such property lines are transversely aligned. The same essential orientation is followed in the development illustrated in FIGURE 13 with one group of transversely extending utility conduits terminating in the vicinity of the property lines dividing lots 6, 8 and lots 5, 7; and lots 10, 12 and lots 9, 11. In the instance of lots 10, 12 and 9, 11, however, the transversely oriented utility conduits are angularly disposed relative to the property lines between which they extend, since such property lines are longitudinally offset relative to each other.

The transversely extending utility conduits are branch conduits and are respectively connected to the corresponding main utility conduits disposed along one or both sides of the roadway. More particularly, the main conduits extend along the longitudinal edges of the roadway exteriorly thereof so that the branch conduits are connected to the main service conduits exteriorly of the longitudinal edges of the roadway. In the arrangement illustrated in FIGURE 1, certain main utility conduits are disposed along one side of Avenue A and others along the opposite side thereof; and in this specific illustration, as is most evident in FIGURE 2, there are four utility services and conduits therefor on each side of Avenue A. For purposes of specific identification, these conduits are denoted with the numerals 15 through 22 and respectively identify the following utility services:

15 for gas,
16 for electricity (secondary or house service),
17 for storm drainage system,
18 for water,
19 for telephone,
20 for sanitary sewer,
21 for fire alarm, and
22 for electricity (primary or distribution service).

The main utility conduits 15, 16, 17 and 22 comprise one group and are all disposed within the same passageway 23 disposed along Avenue A on the side thereof adjacent the odd numbered lots, and the main utility conduits 18 through 21 comprise another group thereof and are all disposed within the same passageway 24 disposed along the opposite side of Avenue A. The passageways 23 and 24 shown in the drawings are back-filled trenches that have been dug in the land and back-filled in layers as each main utility conduit is disposed therein, or back-filled in a single operation after all of the utility conduits have been extended therealong suitably supported by temporary bracing structure. The trenches could be, however, well defined passageways as in the case of a lined trench or one having concrete side and bottom walls. In such event, it usually would be inappropriate to back-fill the passageways with earth and a suitable cover structure would undoubtedly be provided therefor.

The branch conduits are arranged in longitudinally spaced groups, each of which comprises a plurality of conduits respectively connected to the corresponding main utility conduits. For purposes of identification, the various groups of branch conduits indicated in FIGURE 1 are denoted with the numerals 25a and 25b, and the conduits in each group, as shown most clearly in FIGURE 6, are designated by the primed form of the numbers used to identify the corresponding main conduits. In a typical group of branch conduits there are six in number providing gas, electricity, water, telephone and sanitary sewer services; and such branch conduits are respectively designated with the numerals 15', 16', 18', 19' and 20'. Each group of branch conduits is disposed within a common passageway such as the trench 26 shown in FIGURE 6, the back-fill therefor being omitted for clarity in this figure. Again, the branch passageways could be other than back-filled trenches, as heretofore indicated, and at least certain of the branch conduits might lie within closed channels of the type formed by a tool known as the Kret—the term passageway in any event being used to indicate a general area or volume containing a group of conduits.

In certain developments or subdivisions a fire alarm system may not be required and, in such event, would be omitted. Similarly, in developments where gas is not used for heating or cooking, such services would be omitted. While a secondary electric system may be considered a necessity and therefore required, there is no necessity for a primary distribution system in many developments, and this will depend upon the size and location thereof. For example, it is quite common to have located relatively close to the point of electrical entrance to a development a single transformer station to reduce the primary or distribution voltage to a secondary or house service value, and the entire development serviced from such one transformer station.

The conduits for the various utility services may be of different construction and configuration, and for this reason the term conduit is employed to include all such variants, for in no sense can such precise construction be considered to be germane to the present invention. By way of example, the sanitary sewer conduits may be cast iron, concrete or ceramic (that is, clay or other earthern compositions); the main and/or distribution water conduits may be steel, asbestos-cement, copper, or a synthetic thermosetting resinous plastic; the electric distribution conduits can be insulated conductors buried directly in the ground or encased in protective enclosures if special conditions so require.

Conveniently, as illustrated most clearly in FIGURE 3, distribution boxes 27 are located adjacent the ends of each branch passageway 26 to provide a location for the connection of certain utilities to the lots adjacent thereto. Several utility services may be provided at each such distribution box and, in the arrangement shown in the drawings, each box and the compartment 28 defined therewith has gas, water and telephone services extending thereto. Since, as heretofore described, each group of branch utility conduits extends to the vicinity of a common property line dividing adjacent lots, each such lot and the building erected thereon is served by a common distribution box 27. Thus, in FIGURE 3, the boxes 27 respectively serve lots 14 and 16 on one side of Avenue A and the lots 13 and 15 on the opposite side thereof.

As seen in FIGURE 4, each distribution box 27 is equipped with a removable cover 29 to provide convenient access to the compartment 28 therewithin; and in many instances, the water and/or gas meters may be located within the compartments 28 of the distribution box as may the control valves for the lot service. Each of the boxes 27 is a well defined element having side and bottom walls of poured concrete.

The storm drainage system has a main conduit 17 extending along one side of Avenue A in passageway 23 and a plurality of branch conduits 30 connect the same with the opposite side of Avenue A at various locations therealong. Such branch conduits 30 are not usually disposed within the passageways that contain the other branch utility conduits, since the catch basins for the storm drainage system are usually located only at the intersections of various avenues, such as the intersection of Avenue A with Avenues B and C, as shown in FIGURE 1. Thus, in FIGURE 1, catch basins 31 and 32 are disposed on opposite sides of Avenue A adjacent the intersection thereof.

Figure 11:
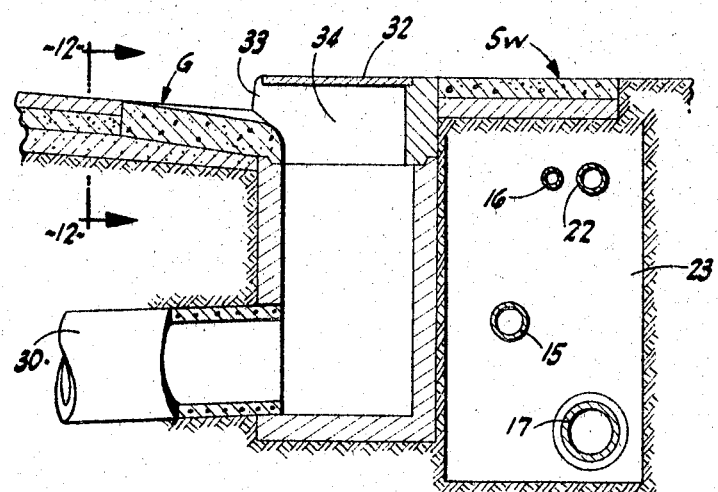
FIGURE 11 is a broken vertical sectional view taken generally along the plane 11—11 of FIGURE 1.
Figure 12:
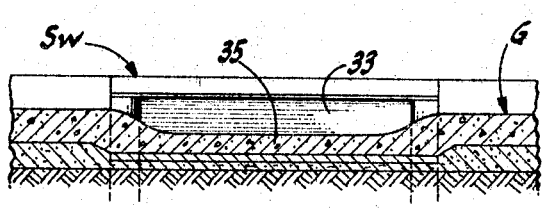
FIGURE 12 is a broken vertical sectional view taken along the plane 12—12 of FIGURE 11.

The catch basins 31 connect directly to the main conduit 17 of the storm drainage system, while the catch basins 32 on the opposite side of Avenue A are connected thereto through the respective branch conduits 30. As shown best in FIGURES 11 and 12, all of the catch basins (basin 32 being exemplary thereof) are located along the longitudinal edges of Avenue A adjacent the gutters G thereof. The gutters have openings 33 in the generally vertical walls thereof, and each such opening communicates with a catch basin, such as the chamber 34 defined by the catch basin 32. The side and bottom walls of each catch basin are rigid members, as shown in FIGURE 11, and the chamber 34 is relatively deep so as to accommodate a substantial volume of water. The branch conduit 30 is connected with the chamber 34 at the lower end thereof and extends across Avenue A for connection with the main conduit 17 thereat. As is most evident in FIGURE 12, the gutters G have depressed sections 35 respectively oriented adjacent the openings 33 to facilitate the flow of fluid materials into the compartments 34 of the various catch basins.

The main water conduit 18 may be provided at advantageous intervals therealong with a control or gate valve 36, as shown in FIGURE 5. Each valve 36 is manipulated by a stem 37 located within a vertically disposed channel or compartment 38 defined by a casing element 39 having at the top thereof a removable cover 40. The cover 40 is located in the plane of the sidewalk SW and provides a part of the upper surface thereof.

Connected with the main water conduit 18 at predetermined locations therealong are water hydrants 41 that, in the form shown, extend upwardly above the plane of the sidewalk adjacent thereto and are disposed along the gutter G. Each of the hydrants may be of usual form, having provision for the connection of fire hoses thereto, and are connected to the main water conduit through a control valve 42 and an elbow or L-shaped pipe section 43 equipped intermediate its ends with a flange 44 intended as a shear point which will break and thereby protect the main conduit 18 in the event that the hydrant is subjected to an impact force of sufficient magnitude. The valve 42 is manipulated through a stem 45 disposed within a vertically oriented channel or compartment 46 defined by a casing 47 having a removable cover 48 disposed in the plane of the adjacent sidewalk and providing a part of the upper surface thereof.

The gas main or conduit 15 may be provided at predetermined intervals therealong with control valves 49, each of which is equipped with a stem 50 that may be reached through a cover-equipped casing disposed beneath the sidewalk, and which may be substantially similar to the casings 39 and 47 heretofore described.

Each of the branch sewer conduits 20' is connected to the main conduit 20 through an arcuate section 51 to facilitate the flow of material therethrough; and a generally vertical conduit section 52 is associated with the branch conduit 20' to provide access thereto for cleaning purposes, and such section 52 is equipped with a removable closure or cap 53. The cap 53 is reached through a cover 54 disposed thereabove which lies in the strip E separating the sidewalk and the lots adjacent thereto. Each branch conduit 20' is common to two adjacent lots at each end thereof and is provided thereat with connector openings 55 and 56 to permit connection thereof with the adjacent lots.

In the form shown, the conduit 20' is a discontinuous or segmented component in the sense that one section thereof is directly connected to the main conduit 20 and extends therefrom across Avenue A, while the other section thereof is connected directly to the main conduit 20 and extends therefrom to the vicinity of a common property line separating a pair of lots on the adjacent side of Avenue A. For purposes of identification, such other or second section is designated with the numeral 57, and is provided with two connector openings 58 and 59 at its outer end to provide a common service to two adjacent lots. The section 57 is also equipped with a cleanout pipe 60 having a removable cap 61 which is reached through an access chamber having a removable cover 62.

Figure 10:
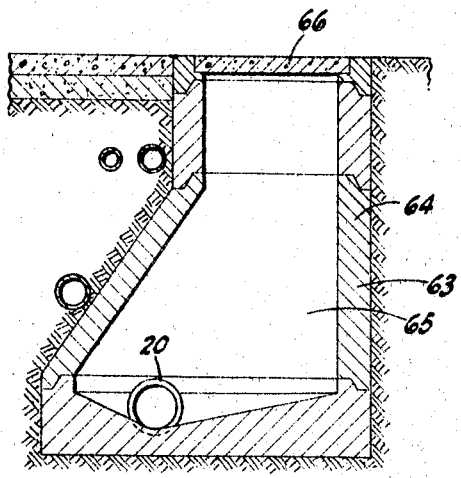
FIGURE 10 is a vertical sectional view showing the details of a service compartment or "manhole" for the sanitary sewer.

At spaced intervals along the main sewer conduit 20 are manholes, one of which is illustrated in FIGURE 10 and is denoted in its entirety with the numeral 63. The manhole 63 comprises a casing 64 that may be a poured concrete component or a preformed structure comprising a plurality of mating sections, as shown. The casing 64 defines a compartment 65 therein, and a removable cover 66 provides access to such compartment. The cover 66 may be disposed along one of the sidewalks SW and forms a portion of the upper surface thereof.

Preferably, at least one electrolier or street light is provided along each block, such as the street light 67 shown in FIGURE 1. In the event of the street lights being on the opposite side of Avenue A relative to the secondary electrical conduit 16, connection is made therebetween by a branch conduit 68 which may be comprised in one of the groups of branch conduits 25a or 25b as heretofore described, or it may be separately located as shown in FIGURE 1.

From the foregoing, it will be apparent that the invention also involves a method of subdividing a parcel of land into a plurality of lots having an access roadway and utility services furnished thereto, and that as a part of such method, a length of roadway is defined along a parcel of land which is then divided into a plurality of lots along each side of the roadway. The adjacent lots are separated by a common property line, and branch utility conduits are recessed in the land in traversing relation with the length of roadway and extend generally between the vicinity of a common property line separating two adjacent lots on one side of the roadway to the vicinity of a common property line separating two adjacent lots on the opposite side of the roadway. The branch conduits are arranged in longitudinally spaced groups thereof and are connected to the respectively corresponding main utility conduits which are recessed along the length of roadway exteriorly thereof.

A parcel of land subdivided and equipped with utility conduits in accordance with the present invention has roadways which are substantially devoid of longitudinally extending utility conduits disposed therebeneath and, in general, compaction of the ground in such parcel is not disturbed by a mosaic of interconnecting and/or superimposed trenches. Therefore, the condition of the land with respect to its compaction closely approximates and provides its inherent or original compressive strength. As a result, the roadways are less subject to cracking and breaking than those usually found in building developments, and the main utility conduits are protected from destructive impact forces since they are not located beneath the roadways. In addition, substantial economies are realized by the developer because the length of time required to complete an entire utilities system is materially shortened, and the total number of steps involved are substantially reduced.

While in the foregoing specification embodiments of the invention have been set forth in considerable detail for purposes of making an adequate disclosure thereof, it will be apparent to those skilled in the art that numerous changes may be made in such details without departing from the spirit and principles of the invention.

What is claimed is:

1. An underground installation for distribution of utilities services within a parcel of land having a longitudinally extending length of roadway located therein and being divided into a plurality of lots along said roadway each of which is defined at least in part by a property line transversely oriented with respect to said roadway, said installation comprising:
   (a) a plurality of main conduits defining utility services and being disposed in said land below its surface and extending along a side of said roadway laterally exterior thereto; and
   (b) a plurality of groups of branch conduits disposed in said land below the surface thereof and extending laterally from said main conduits in traversing relation with said length of roadway, each group of branch conduits being spaced from the next group thereof lengthwise of said main conduits and being located and oriented to extend from the vicinity of such property line on one side of said length of roadway to the vicinity of a property line on the other side of said roadway to enable a plurality of adjacent lots to be served by a single traversal of said roadway and by the group of branch conduits making the same, the branch conduits constituting each group thereof being respectively connected to said main conduits to provide such utility services at the other side of said length of roadway;

the land defining said length of roadway being essentially devoid of utility conduits below the surface thereof, other than for said branch conduits.

2. An underground installation for distribution of utilities services within a parcel of land having a longitudinally extending length of roadway located therein and being divided into a plurality of lots along each side of said roadway, certain of said lots having common property lines separating the same, said installation comprising:
   (a) a plurality of main conduits defining utility services and being disposed in said land below its surface and extending along a side of said roadway laterally exterior thereto; and
   (b) a plurality of groups of branch conduits disposed in said land below the surface thereof and extending laterally from said main conduits in traversing relation with said length of roadway, each group of branch conduits being spaced from the next group thereof lengthwise of said main conduits and being located and oriented to extend from the vicinity of a common property line between a pair of lots on one side of said length of roadway to the vicinity of a common property line between a pair of adjacent lots on the other side of said roadway so that such pair of adjacent lots is served by a single traversal of said roadway and by the group of branch conduits making the same, the branch conduits constituting each group thereof being respectively connected to said main conduits to provide such utility services at said adjacent lots on the other side of said length of roadway;

the land defining said length of roadway being essentially devoid of utility conduits below the surface thereof, other than for said branch conduits.

3. An underground installation for distribution of utilities services within a parcel of land having a longitudinally extending length of roadway located therein and being divided into a plurality of lots along each side of said roadway, certain of said lots having common property lines separating the same, said installation comprising:
   (a) a plurality of main conduits defining utility services and being disposed in said land below its surface and extending along a side of said roadway laterally exterior thereto; and
   (b) a plurality of groups of branch conduits disposed in said land below the surface thereof and extending laterally from said main conduits in traversing relation with said length of roadway, each group of branch conduits being spaced from the next group thereof lengthwise of said main conduits and being located and oriented to extend from the vicinity of a common property line between a pair of lots on one side of said length of roadway to the vicinity of a common property line between a pair of adjacent lots on the other side of said roadway so that such pair of adjacent lots is served by a single traversal of said roadway and by the group of branch conduits making the same, the branch conduits constituting each group thereof being respectively connected to said main conduits to provide such utilities services at said adjacent lots on the other side of said length of roadway;

at least certain of said main conduits and also the branch conduits respectively connected thereto being disposed in vertically spaced relation to others thereof to facilitate subsequent access thereto should it be required, without necessity for separately excavating said roadway to obtain access to the individual conduits supplying each of the utility services, and the land defining said length of roadway being essentially devoid of utility conduits below the surface thereof, other than for said branch conduits.

4. An underground installation for distribution of utilities services within a parcel of land having a longitudinally extending length of roadway located therein and being divided into a plurality of lots along each side of said roadway, certain of said lots having common property lines separating the same, said installation comprising:

(a) a back filled main trench in said land below the surface thereof and extending along one side of said roadway laterally exterior thereto;

(b) a main conduit disposed in said main trench and defining a utility service;

(c) a back filled branch trench in said land below the surface thereof and extending laterally from said main trench in traversing relation with said length of roadway and being located and oriented to extend from the vicinity of a common property line between a pair of lots on one side of said length of roadway to the vicinity of a common property line between a pair of adjacent lots on the other side of said roadway; and (d) a branch conduit disposed in said branch trench and being connected to said main conduit so that such pair of adjacent lots are served by a single traversal of said roadway and by the branch conduit within said branch trench which provides such utility service at such pair of adjacent lots;

the land defining said length of roadway being essentially devoid of utility conduits below the surface thereof, other than for said branch conduit.

5. An underground installation for distribution of utilities services within a parcel of land having a longitudinally extending length of roadway located therein and being divided into a plurality of lots along each side of said roadway, certain of said lots having common property lines separating the same, said installation comprising:

(a) a back filled main trench in said land below the surfaces thereof and extending along one side of said roadway laterally exterior thereto;

(b) a plurality of main conduits disposed in said main trench and defining utility services;

(c) a plurality of back filled branch trenches in said land below the surface thereof and extending laterally from said main trench in traversing relation with said length of roadway, each branch trench being spaced from the next branch trench lengthwise of said main trench and being located and oriented to extend from the vicinity of a common property line between a pair of lots on one side of said length of roadway to the vicinity of a common property line between a pair of adjacent lots on the other side of said roadway; and (d) a plurality of branch conduits disposed in each of said branch trenches and being respectively connected to said main conduits so that each pair of adjacent lots separated by such common property line are served by a single traversal of said roadway and by a group of branch conduits making the same within the branch trench therefor;

the land defining said length of roadway being essentially devoid of utility conduits below the surfaces thereof, other than for said branch conduits.

6. The underground installation of claim 5 in which at least certain of said main conduits and also the branch conduits respectively connected thereto are disposed in vertically spaced relation to others thereof to facilitate subsequent access thereto should it be required without necessity for separately excavating said roadway to obtain access to the individual conduits supplying each of the utility services.

7. The underground installation of claim 5 in which an additional main trench is provided in said land below the surface thereof along the other side of said roadway laterally exterior thereto, in which at least one additional main conduit is disposed within said additional main trench, and in which a plurality of additional branch conduits are respectively disposed in said branch trenches and are connected to said additional main conduit.

8. The underground installation of claim 5 in which said installation includes a plurality of cover-equipped distribution boxes defining compartments therewithin and being respectively disposed adjacent the ends of said branch trenches to define location for connection of utility services to the lots adjacent thereto.

9. The underground installation of claim 5 in which said parcel of land is provided with a longitudinally extending sidewalk disposed along said length of roadway adjacent a side thereof, and in which said main trench is located beneath said sidewalk.

References Cited by the Examiner
UNITED STATES PATENTS

| | | | |
|---|---|---|---|
| 263,142 | 8/1882 | Edison | 174—38 |
| 342,552 | 5/1886 | Westinghouse | 174—38 |
| 355,330 | 1/1887 | Locke | 138—105 |
| 1,317,495 | 9/1919 | Hessel | 138—105 |
| 1,997,801 | 4/1953 | Lockhart | 137—236 |
| 2,938,437 | 5/1960 | Daley | 94—31.1 |
| 2,997,071 | 8/1961 | May | 138—105 |

OTHER REFERENCES

Standard Vitrified Conduit Company, copyright 1903, pp. 28, 51, 60, and 61.

CHARLES E. O'CONNELL, *Primary Examiner.*

JACOB L. NACKENOFF, *Examiner.*

M. O. WARNECKE, *Assistant Examiner.*